US012699228B2

(12) United States Patent
Islam et al.

(10) Patent No.: US 12,699,228 B2
(45) Date of Patent: Aug. 4, 2026

(54) GRATING COUPLER WITH HIGH EFFICIENCY

(71) Applicant: Apple Inc., Cupertino, CA (US)

(72) Inventors: Nurul Taimur Islam, Cupertino, CA (US); Helen H. Liang, Los Gatos, CA (US); Malcolm J. Northcott, Santa Cruz, CA (US); Ariel Lipson, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 18/357,181

(22) Filed: Jul. 24, 2023

(65) Prior Publication Data

US 2024/0045146 A1 Feb. 8, 2024

Related U.S. Application Data

(60) Provisional application No. 63/395,830, filed on Aug. 7, 2022.

(51) Int. Cl.
G02B 6/34 (2006.01)
G02B 6/124 (2006.01)
(Continued)

(52) U.S. Cl.
CPC ............... G02B 6/34 (2013.01); G02B 6/124 (2013.01); G02B 6/276 (2013.01); G02B 6/2773 (2013.01);
(Continued)

(58) Field of Classification Search
CPC .. G02B 5/1823; G02B 6/12002; G02B 6/124; G02B 6/276; G02B 6/2773; G02B 6/2804; G02B 6/34
See application file for complete search history.

(56) References Cited

U.S. PATENT DOCUMENTS 6,424,407 B1    7/2002  Kinrot et al.
9,122,015 B2 *  9/2015  Shimizu ............. G02B 6/12002
(Continued)

FOREIGN PATENT DOCUMENTS

CN    109541619 A    3/2019
CN    113866875 A * 12/2021 ............... G02B 6/10
(Continued)

OTHER PUBLICATIONS

English Translation for CN-113866875-A, 12 pages. (Year: 2021).*
(Continued)

*Primary Examiner* — Daniel Petkovsek
(74) *Attorney, Agent, or Firm* — Meitar Patents LTD.; Daniel Kligler

(57) ABSTRACT

An optical coupling device includes a first waveguide layer, including a first semiconductor material, which is disposed over a dielectric substrate layer. A dielectric intermediate layer overlies the first waveguide layer. A second waveguide layer, which includes a different, second semiconductor material, is disposed over the dielectric intermediate layer and is patterned to define a waveguide. A first grating in the second waveguide layer diffracts light of a given wavelength from the waveguide into a specified diffraction order at a given coupling angle, whereby a first fraction of the light propagates out of the device while a second fraction of the light is diffracted into the intermediate dielectric layer in a conjugate diffraction order. A second grating in the first waveguide layer diffracts the second fraction of the light into a second diffraction order, propagating out of the device at the given coupling angle.

16 Claims, 7 Drawing Sheets

(51) Int. Cl.
G02B 6/27 (2006.01)
G02B 6/28 (2006.01)
G02B 6/12 (2006.01)
(52) U.S. Cl.
CPC ........ G02B 6/2804 (2013.01); G02B 6/12002
(2013.01)

(56) References Cited

U.S. PATENT DOCUMENTS

| | | | |
|---|---|---|---|
| 9,529,079 B1 | 12/2016 | Droz et al. | |
| 9,971,948 B1 | 5/2018 | Herrington et al. | |
| 10,018,723 B2 | 7/2018 | Sromin et al. | |
| 10,416,385 B1* | 9/2019 | Mikkelsen | G02B 6/12004 |
| 10,883,874 B2* | 1/2021 | Cho | G01J 3/18 |
| 10,908,267 B1 | 2/2021 | Gagne et al. | |
| 12,189,179 B2* | 1/2025 | Huang | G02B 6/34 |
| 2006/0227316 A1 | 10/2006 | Gatt | |
| 2010/0265504 A1* | 10/2010 | Kopp | G02B 6/126 |
| | | | 385/14 |
| 2013/0206963 A1 | 8/2013 | Grund | |
| 2013/0208258 A1 | 8/2013 | Eisele et al. | |
| 2017/0172510 A1 | 6/2017 | Homyk et al. | |
| 2017/0179680 A1* | 6/2017 | Mahgerefteh | H01S 5/12 |
| 2017/0285325 A1 | 10/2017 | Erlich et al. | |
| 2017/0299698 A1 | 10/2017 | Yagi et al. | |
| 2017/0322015 A1 | 11/2017 | Knüttel | |
| 2019/0025426 A1 | 1/2019 | Satyan et al. | |
| 2019/0170938 A1* | 6/2019 | Plantier | G02B 6/12007 |
| 2020/0234785 A1 | 7/2020 | Kyselov et al. | |
| 2020/0257128 A1 | 8/2020 | Sakai et al. | |
| 2020/0341200 A1* | 10/2020 | Van Vaerenbergh | G02B 6/124 |
| 2021/0109197 A1 | 4/2021 | O'Keeffe | |
| 2021/0165083 A1 | 6/2021 | Fine et al. | |
| 2021/0257396 A1 | 8/2021 | Piggott et al. | |
| 2021/0311194 A1 | 10/2021 | Boloorian | |
| 2021/0314734 A1 | 10/2021 | Mehta et al. | |
| 2021/0341611 A1 | 11/2021 | Boloorian | |
| 2021/0373350 A1 | 12/2021 | Oda et al. | |
| 2021/0382153 A1 | 12/2021 | Dielacher et al. | |
| 2021/0405164 A1 | 12/2021 | Klemme et al. | |
| 2022/0043108 A1 | 2/2022 | Lavian | |
| 2022/0050201 A1 | 2/2022 | Sun et al. | |
| 2022/0075076 A1 | 3/2022 | Michaels et al. | |
| 2022/0091242 A1 | 3/2022 | Gagne et al. | |
| 2022/0113379 A1 | 4/2022 | Viswanatha et al. | |
| 2022/0187457 A1 | 6/2022 | Daami et al. | |
| 2022/0404475 A1 | 12/2022 | Laflaquiere et al. | |
| 2023/0393241 A1 | 12/2023 | Barragan et al. | |
| 2024/0069285 A1 | 2/2024 | Hajati et al. | |
| 2024/0288552 A1 | 8/2024 | Milgrome et al. | |
| 2024/0369689 A1 | 11/2024 | Hajati et al. | |
| 2025/0116763 A1 | 4/2025 | Spollard et al. | |

FOREIGN PATENT DOCUMENTS

| | | | |
|---|---|---|---|
| CN | 115605774 A | 1/2023 | |
| CN | 115932888 A | 4/2023 | |
| DE | 102020213161 A1 | 4/2022 | |
| EP | 3961257 A1 | 3/2022 | |
| EP | 3971614 A1 | 3/2022 | |
| ES | 2896302 T3 | 2/2022 | |
| WO | 2015098288 A1 | 7/2015 | |
| WO | 2018102190 A1 | 6/2018 | |
| WO | 2020161260 A1 | 8/2020 | |
| WO | 2020190338 A1 | 9/2020 | |
| WO | 2022168500 A1 | 8/2022 | |
| WO | 2023012527 A1 | 2/2023 | |

OTHER PUBLICATIONS

Non-Final Office Action, U.S. Appl. No. 17/838,217, dated Jul. 30, 2025.

Non-Final Office Action U.S. Appl. No. 17/863,419, dated Aug. 12, 2025.
Huang, Frequency-modulated continuous-wave 3D imaging with high photon efficiency Huang, Jul. 12, 2022, vol. 47, pp. 3568-3571.
Non-Final Office Action, U.S. Appl. No. 18/759,249, Dated Jul. 23, 2025.
Japanese Office Action, Application # 2024-115446, dated Jun. 2, 2025.
Japanese Office Action, Application # 2024-115446, dated Oct. 14, 2025.
Ma et al., "Self-Supervised Sparse-to-Dense: Self-Supervised Depth Completion from LiDAR and Monocular Camera", 2019 International Conference on Robotics and Automation(ICRA), Aug. 12, 2019, pp. 1-12.
Wang, "Investigation of New Concepts and Solutions for Silicon Nanophotonics," Doctoral Thesis in Microelectronics and Applied Physics, Stockholm, Sweden, pp. 1-91, year 2010.
Sacher et al., "Wide Bandwidth and High Coupling Efficiency Si3N4-on-SOI Dual-level Grating Coupler," Optics Express, vol. 22, No. 9, pp. 1-10, May 5, 2014.
Rogers et al., "A Universal 3D Imaging Sensor on a Silicon Photonics Platform," ArXiv:2008.02411v3, pp. 1-18, Nov. 11, 2020.
Lumerical Inc., "Tutorial—Splitter Optimization," pp. 1-8, year 2019, as downloaded from https://lumopt.readthedocs.io/en/latest/tutorial.html.
Nicolaescu et al., "3D Imaging via Silicon-photonics-based LIDAR," Proc. SPIE vol. 11691, Silicon Photonics XVI, pp. 1-12, year 2021.
Marchetti et al., "Coupling Strategies for Silicon Photonics Integrated Chips [Invited]," Photonics Reseach, vol. 7, No. 2, pp. 1-39, Feb. 2019.
Marchetti et al., "High-efficiency Grating-couplers: Demonstration of a New Design Strategy," Springer Nature, Scientific Reports, vol. 7, pp. 1-9, Nov. 2017.
Hooten et al., "Inverse Design of Grating Couplers Using the Policy Gradient Method from Reinforcement Learning," De Gruyter, Nanophotonics, vol. 10, issue 15, pp. 3843-3856, year 2021.
Michaels, "A Hierarchical Approach to the Design and Optimization of Photonics," PhD Thesis, University of California, Berkeley, pp. 1-139, year 2019.
Molesky, "Outlook for Inverse Design in Nanophotonics," arXiv:1801.06715v1, pp. 1-13, Jan. 20, 2018.
International Application # PCT/US2023/066803 Search Report dated Jul. 27, 2023.
Kamali et al., "A review of dielectric optical metasurfaces for wavefront control," Nanophotonics, Open Access, pp. 1-84, May 18, 2018.
Xiong et al., "Controlling the degrees of freedom in metasurface designs for multi-functional optical devices," Nanoscale Advances, vol. 1, pp. 3786-3806, year 2019.
Wikipedia, "Laser speckle contrast imaging," pp. 1-8, last edited Dec. 12, 2023.
Li et al., "Transmissive-detected laser speckle contrast imaging for blood flow monitoring in thick tissue: , from Monte Carlo simulation to experimental demonstration," Nature, Light: Science & Applications, vol. 10, article No. 241, pp. 1-43, Dec. 3, 2021.
Heeman et al., "Clinical applications of laser speckle contrast imaging: a review," Journal of Biomedical Optics, vol. 24, No. 8, pp. 080901-1-80901-11, Aug. 2019.
Zalevsky et al., "Simultaneous remote extraction of multiple speech sources and heart beats from secondary speckles pattern," Optics Express, vol. 17, No. 24, pp. 1-15, Nov. 23, 2009.
Vasilyev, "The Optoelectronic Swept-Frequency Laser and Its Applications in Ranging, Three-Dimensional Imaging, and Coherent Beam Combining of Chirped-Seed Amplifiers," Doctoral Thesis, California Institute of Technology, pp. 1-177, year 2013.
International Application # PCT/US2023/084979 Search Report dated Mar. 12, 2024.
Ding et al., "Compensation of Laser Frequency Tuning Nonlinearity of a Long Range OFDR Using Deskew Filter," Optics Express, vol. 21, No. 3, pp. 3826-3834, Feb. 11, 2013.
Du et al., "Method for Improving Spatial Resolution and Amplitude by Optimized Deskew Filter in Long-Range OFDR," IEEE Photonics Journal, vol. 6, No. 5, pp. 1-13, Oct. 2014.

(56) References Cited

OTHER PUBLICATIONS

Sandborn, "FMCW Lidar: Scaling to the Chip-Level and Improving Phase-Noise-Limited Performance," Dissertation, Electrical Engineering and Computer Sciences, University of California at Berkeley, USA, pp. 1-90, Dec. 1, 2019.

Meta et al., "Signal Processing for FMCW SAR," IEEE Transactions on Geoscience and Remote Sensing, voume 45, No. 11, pp. 3519-3532, Nov. 2007.

Peek, "Estimation and Compensation of Frequency Sweep Nonlinearity in FMCW Radar," M.Sc. thesis in Applied Mathematics, The University of Twente,The Netherlands, pp. 1-67, Sep. 2011.

Meta et al., "Range Non-Linearities Correction in FMCW SAR," IEEE, pp. 403-406, year 2006.

Baumann et al., "Speckle Phase Noise in Coherent Laser Ranging: Fundamental Precision Limitations," Optics Letters, vol. 39, issue 16, pp. 4776-4779, Aug. 15, 2014.

Islam et al., U.S. Appl. No. 17/577,039, filed Jan. 17, 2022.

Islam et al., U.S. Appl. No. 17/742,419, filed May 12, 2022.

Cohen, U.S. Appl. No. 17/838,217, filed Jun. 12, 2022.

Islam et al., U.S. Appl. No. 17/863,419, filed Jul. 13, 2022.

Northcott et al., U.S. Appl. No. 18/094,999, filed Jan. 10, 2023.

Kendrisic et al., "Thermally Tuned VCSEL-Based SS-OCT System," Biophotonics Congress: Biomedical Optics (Translational, Microscopy, OCT, OTS, BRAIN), Optica Publishing Group, pp. 1-2, year 2022.

Axelrod et al., "Reconfigurabe Quasi-Resonance Scanner for 3D FMCW Imaging," Optics Letters, vol. 39, issue 16, pp. 4776-4779, year 2014.

Shnaiderman et al., U.S. Appl. No. 18/094,997, filed Jan. 10, 2023.

Oggier et al., U.S. Appl. No. 18/113,104, filed Feb. 23, 2023.

Shnaiderman et al., U.S. Appl. No. 18/314,843, filed May 10, 2023.

* cited by examiner

1

GRATING COUPLER WITH HIGH EFFICIENCY

CROSS-REFERENCE TO RELATED APPLICATION

This application claims the benefit of U.S. Provisional Patent Application 63/395,830, filed Aug. 7, 2022, which is incorporated herein by reference.

FIELD OF THE INVENTION

The present invention relates generally to optical components and systems, and particularly to devices and methods for coupling light into and out of waveguides.

BACKGROUND

In some coherent sensing arrangements, a modulated beam of coherent light (typically a monochromatic single-mode laser beam) is directed toward a target. Reflected light that is received from the target is mixed with a sample of the transmitted light (referred to as the local beam or local oscillator (LO)) and detected by a photodetector, such as a balanced photodiode pair. The photodetector outputs a signal at a beat frequency that is proportional to the range of the target. The sensing arrangement may be either monostatic, meaning that the transmitted and reflected beams exit and enter the optical transceiver along the same axis and through the same optical aperture, or bistatic, meaning that the transmit and receive axes and apertures are displaced relative to one another.

Optical transceivers are commonly implemented on a photonic integrated circuit (PIC), which is produced by applying photolithographic techniques to produce waveguides and other optical components in thin-film layers on a semiconductor substrate, such as a silicon-on-insulator (SOI) substrate. One of the challenges in producing a PIC is to couple light into and out of the waveguides on the PIC, typically from or to an optical fiber or free space. Grating couplers are commonly used for this purpose, as they can be placed anywhere on the PIC and can be tested before the substrate wafer is diced. Grating couplers, however, tend to suffer from low coupling efficiency, meaning that a large fraction of the light traveling through the waveguide is not coupled into the desired transmission mode, or that a large fraction of the light incident on the grating coupler is not coupled into the receiving waveguide.

The terms "light" and "optical radiation," as used in the context of the present description and in the claims, refer to electromagnetic radiation in any of the infrared, visible, and ultraviolet spectral ranges.

SUMMARY

Embodiments of the present invention that are described hereinbelow provide grating couplers with enhanced efficiency and methods for design of such grating couplers.

There is therefore provided, in accordance with an embodiment of the invention, an optical coupling device, including a dielectric substrate layer and a first waveguide layer, including a first semiconductor material, which is disposed over the dielectric substrate layer. A dielectric intermediate layer overlies the first waveguide layer, and a second waveguide layer, which includes a second semiconductor material, different from the first semiconductor material, is disposed over the dielectric intermediate layer and is patterned to define a waveguide. A first grating is formed in the second waveguide layer and is configured to diffract light of a given wavelength from the waveguide into a specified diffraction order at a given coupling angle, whereby a first fraction of the light propagates out of the device at the given coupling angle while a second fraction of the light is diffracted by the first grating into the intermediate dielectric layer in a conjugate diffraction order. A second grating is formed in the first waveguide layer and is configured to diffract the second fraction of the light into a second diffraction order, propagating out of the device at the given coupling angle.

In some embodiments, the first grating is configured to diffract the light of a first polarization into the specified diffraction order, and the second grating is further configured to diffract light of the given wavelength that is incident on the device at the given angle with a second polarization, orthogonal to the first polarization, into the first waveguide layer. In a disclosed embodiment, the first polarization is a TE polarization propagating in the waveguide in the second waveguide layer, and the first waveguide layer includes a further waveguide, and the second polarization is a TM polarization, which propagates in the further waveguide.

There is also provided, in accordance with an embodiment of the invention, an optical transceiver, including a device as described above, and an optical transmitter, which is coupled to transmit the light of the first polarization into the waveguide in the second waveguide layer. An optical receiver is coupled to receive the light of the second polarization from a further waveguide in first waveguide layer.

In a disclosed embodiment, the light includes coherent radiation, and the transceiver includes a mixer, which is coupled to mix a part of the transmitted light with the light that is received through the further waveguide and to output the mixed light to the optical receiver. In an additional embodiment, the first grating is further configured to diffract the light of the first polarization that is incident on the device at the given angle into the waveguide, and the transceiver includes a further mixer, which is coupled to mix a further part of the transmitted light with the incident light of the first polarization that is received through the waveguide for output to a detector.

There is additionally provided, in accordance with an embodiment of the invention, apparatus for optical sensing, including a substrate and an array of optical transceivers as described above, disposed on the substrate and configured to transmit and receive the light via respective optical coupling devices, as were likewise described above. In one embodiment, the optical coupling devices have respective coupling angles that vary across the array.

In a disclosed embodiment, the first waveguide layer includes silicon, and the second waveguide layer includes silicon nitride.

There is further provided, in accordance with an embodiment of the invention, apparatus for optical sensing, including a substrate and an array of optical cells, which are disposed on the substrate and include respective optical coupling devices having respective coupling angles that vary across the array.

In a disclosed embodiment, the optical coupling devices include grating couplers.

Additionally or alternatively, the optical cells include optical transceivers, which are configured to transmit and receive light at the respective coupling angles.

In some embodiments, the apparatus includes optics having a pupil, wherein the respective coupling angles of the optical coupling devices are directed toward a center of the pupil.

There is moreover provided, in accordance with an embodiment of the invention, a method for optical coupling, which includes depositing a first waveguide layer, including a first semiconductor material, over a dielectric substrate layer and depositing a dielectric intermediate layer over the first waveguide layer. A second waveguide layer, which includes a second semiconductor material, different from the first semiconductor material, is deposited over the dielectric intermediate layer and is patterned to define a waveguide. A first grating is formed in the second waveguide layer. The first grating is configured to diffract light of a given wavelength from the waveguide into a specified diffraction order at a given coupling angle, whereby a first fraction of the light propagates out of the method at the given coupling angle while a second fraction of the light is diffracted by the first grating into the intermediate dielectric layer in a conjugate diffraction order. A second grating is formed in the first waveguide layer and is configured to diffract the second fraction of the light into a second diffraction order, propagating out of the method at the given coupling angle.

The present invention will be more fully understood from the following detailed description of the embodiments thereof, taken together with the drawings in which:

DETAILED DESCRIPTION OF EMBODIMENTS

Figure 1:
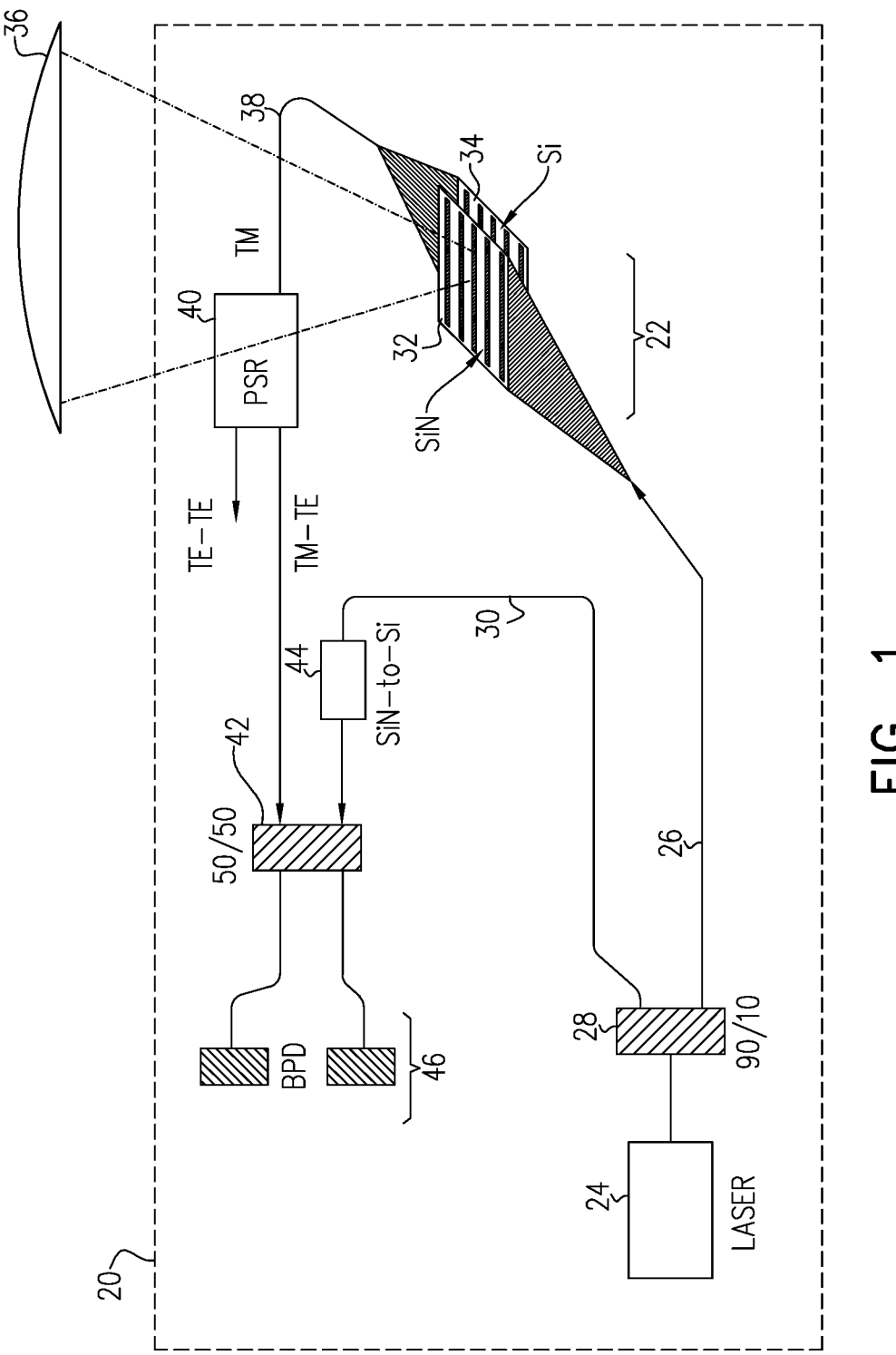
FIG. 1 is a schematic pictorial view of a monostatic optical transceiver with a bidirectional coupling device, in accordance with an embodiment of the invention.

LiDAR systems transmit optical radiation toward a target scene and receive light reflected from the scene in either a monostatic or a bistatic mode. Some LiDAR systems may use a single optical transceiver together with a scanner, such as a rotating mirror, to scan the field of view of the transceiver over a scene. Other LiDAR systems use an array of optical transceivers, in either a scanning or a staring mode. In both scanning and staring modes of operation, the monostatic configuration is advantageous in avoiding optical distortion and parallax effects, particularly at close range. Monostatic operation, however, requires that the transmitted and received beams be aligned along the same axis, which may require additional beam-combining optics and can lead to loss of beam energy, as well as back-reflection of the transmitted beam into the receiver.

LiDAR transceivers, and particularly LiDAR transceiver arrays, may advantageously be constructed using SOI-based PICs with single-mode waveguides. Silicon waveguides surrounded by an oxide layer on the PIC have high refractive index contrast and thus facilitate miniaturization and low-loss transmission within the transceiver. The optical power propagating in the silicon waveguides, however, is limited to a few tens of milliwatts due to nonlinear effects in silicon. This power limit may be acceptable for the received beam, since the received signal power is typically small, but is often too low for the transmitted beam. One solution to this problem is to use an additional waveguide layer comprising a different semiconductor material, such as silicon nitride (SiN), for the transmitted beam. SiN has lower index contrast than silicon but is able to transmit high powers without significant nonlinear effects.

Thus, some embodiments of the present invention provide optical transceivers in which an optical receiver, formed on a PIC, is coupled to receive light via a receive waveguide in first waveguide layer, such as a silicon waveguide layer, while an optical transmitter transmits light through a transmit waveguide in a second waveguide layer made from a different material, such as SiN. Typically, the waveguide layers are separated by a dielectric intermediate layer, such as a layer of $SiO_2$, overlying the first waveguide layer. For monostatic operation, the optical transceiver includes a coupling device that both transmits outgoing light from the transmit waveguide out of the PIC at a given angle and couples incoming light at the same given angle into the receive waveguide. Advantageously, the coupling device is designed to deflect outgoing light from the transmit waveguide with one polarization, for example TE polarization, and to deflect incoming light into the receive waveguide with the orthogonal polarization, for example TM polarization.

In the disclosed embodiments, the optical coupling device comprises two gratings: a first grating in the transmit waveguide layer (for example, the SiN layer) and a second grating, below the first grating, in the receive waveguide layer (for example, the silicon layer). Due to the low index contrast of SiN, however, the first grating, taken by itself, is liable to have low coupling efficiency and low numerical aperture (NA). One of the reasons for this loss of efficiency is that while the first grating by design diffracts a first fraction of the transmitted light at a given transmit wavelength into a particular diffraction order (for example, the +1 order) that propagates out of the coupling device at the desired angle, a substantial second fraction of the transmitted light—as as much as 50% when the first grating is etched all the way through the transmit waveguide layer—is diffracted into the intermediate dielectric layer in a conjugate diffraction order (for example, the −1 order).

To alleviate the resulting loss of transmitted energy, the second grating is configured to diffract this second fraction of the light into another diffraction order, which propagates out of the coupling device at the same angle as the first fraction. In other words, the second grating serves as a sort of mirror and reflects the light in the conjugate diffraction order back out of the device. Thus, the coupling efficiency of the transmitted beam is enhanced (and may be nearly doubled at certain angles), and the NA increased.

As noted above, for monostatic operation of the optical transceiver containing this optical coupling device, the transmitted light is typically polarized, for example with a TE polarization; and the first and second gratings are optimized for high efficiency in coupling light of this polarization out of the PIC at the desired angle. The second grating, in the first waveguide layer (for example, in the silicon waveguide layer) is simultaneously optimized to couple incoming light at the transmit wavelength with the orthogonal (TM) polarization that is incident on the PIC at this same angle into the receive waveguide. The first grating is designed to be substantially transparent to the orthogonal polarization.

Alternatively, the arrangement of first and second gratings, with the second grating acting as a mirror for the conjugate diffraction order, can be used by itself to enhance the efficiency and NA of beam coupling into or out of a waveguide, without necessarily being used for bidirectional coupling as described above. Although the embodiments described below are directed particularly to monostatic LiDAR transceivers and transceiver arrays, fabricated on an SOI PIC, the principles of the present invention may alternatively be applied in other sorts of integrated optical devices and using other fabrication technologies. All such alternative applications and implementations are considered to be within the scope of the present invention.

FIG. 1 is a schematic pictorial view of a monostatic optical transceiver 20 with a bidirectional coupling device 22, in accordance with an embodiment of the invention. Transceiver 20 is used for coherent optical sensing, for example in a frequency-modulated continuous-wave (FMCW) LiDAR system. Transceiver 20 may be used on its own or may be integrated in an array of such transceivers (not shown in the figures), which are disposed on a common substrate, such as an SOI die or another suitable semiconductor or dielectric substrate. In the present example, transceiver 20 is formed on an SOI die, which includes a silicon waveguide layer and an overlying SiN waveguide layer. Details of the layer structure are described below with reference to FIGS. 2 and 3A/B.

Transceiver 20 comprises an optical transmitter, such as a laser, which transmits modulated coherent light of a given wavelength and polarization, such as TE polarization, into a transmit waveguide 26. In the present embodiments, the wavelength is assumed to be within the transmission bands of silicon and SiN in the near infrared range, although other wavelength ranges may similarly be accommodated using different sorts of waveguide materials. A splitter 28 splits off a small part of the transmitted light into a local oscillator (LO) waveguide 30. Waveguides 26 and 30 are formed in the SiN waveguide layer.

Coupling device 22 comprises an upper grating 32 formed in the SiN layer and a lower grating 34 formed in the silicon waveguide layer. Gratings 32 and 34 together couple the light from transmit waveguide 26 out of transceiver 20 at a selected coupling angle, which is determined by the designs of the gratings. Optics 36 typically collimate and direct the outgoing light toward a target and similarly focus light reflected from the target onto coupling device 22, at the same angle as the outgoing light.

Coupling device 22 couples the incident light that is received from optics 36 with polarization orthogonal to the transmitted light, for example with TM polarization, into a receive waveguide 38. In this example, receive waveguide 38 is formed in the silicon waveguide layer. A polarization splitter/rotator (PSR) 40 converts the TM polarization in receive waveguide 38 to TE polarization, while rejecting any TE-polarized light that scattered into the receive waveguide. Alternatively, coupling device 22 may be designed so that such a small fraction of the TE-polarized light propagates into receive waveguide 38 that a polarization splitter is not required (although a half-wave rotator may still be needed). A mixer 42 mixes the received light from polarization splitter/rotator (PSR) 40 with the light from LO waveguide 30 (which is coupled into the silicon waveguide layer by a layer coupler 44). An optical receiver 46, comprising a suitable detector such as a balanced photodiode (BPD) pair, receives the mixed light from mixer 42 and generates an electrical output signal, for example a beat signal, which is processed to estimate the range and possibly the velocity of the target.

In an alternative embodiment, a waveguide in the silicon waveguide layer may be used to transmit outgoing light, while a waveguide in the SiN waveguide layer receives the incoming light.

Figure 2:
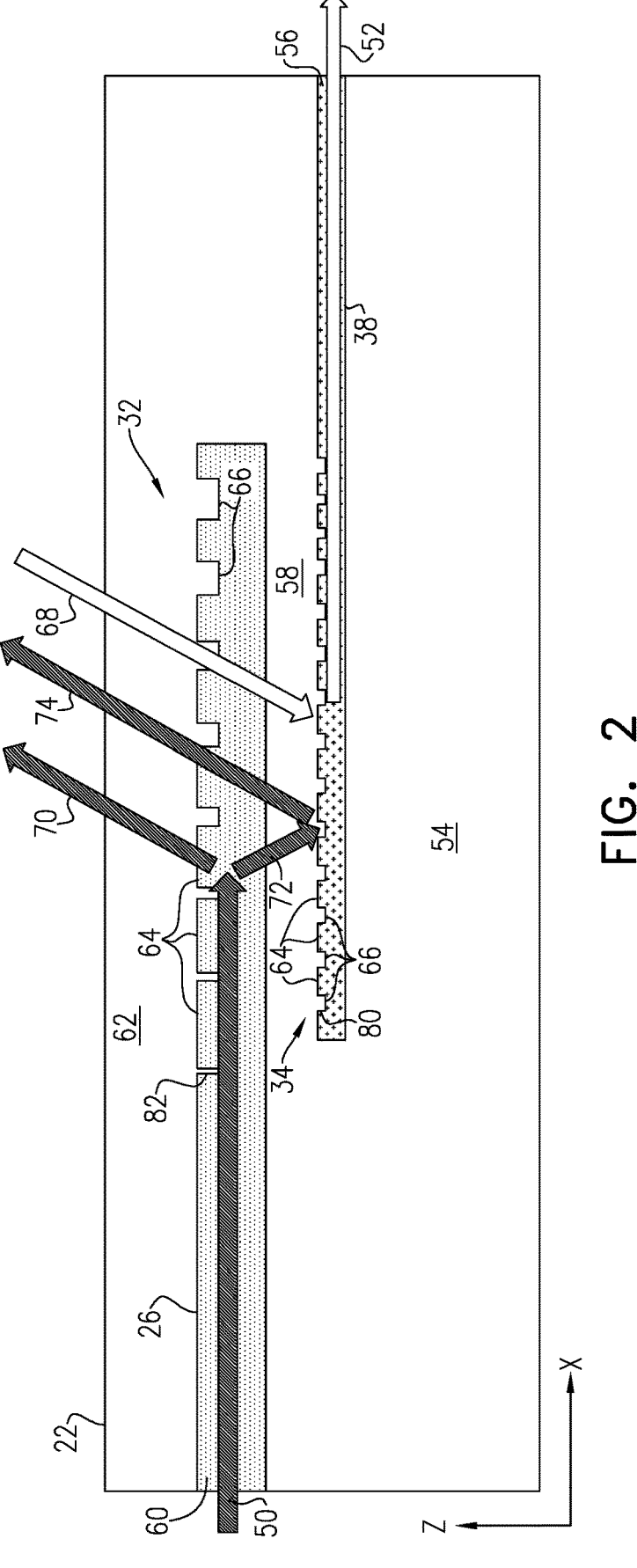
FIG. 2 is a schematic sectional view of a coupling device showing the paths of transmitted and received beams, in accordance with an embodiment of the invention.
Figure 3A:
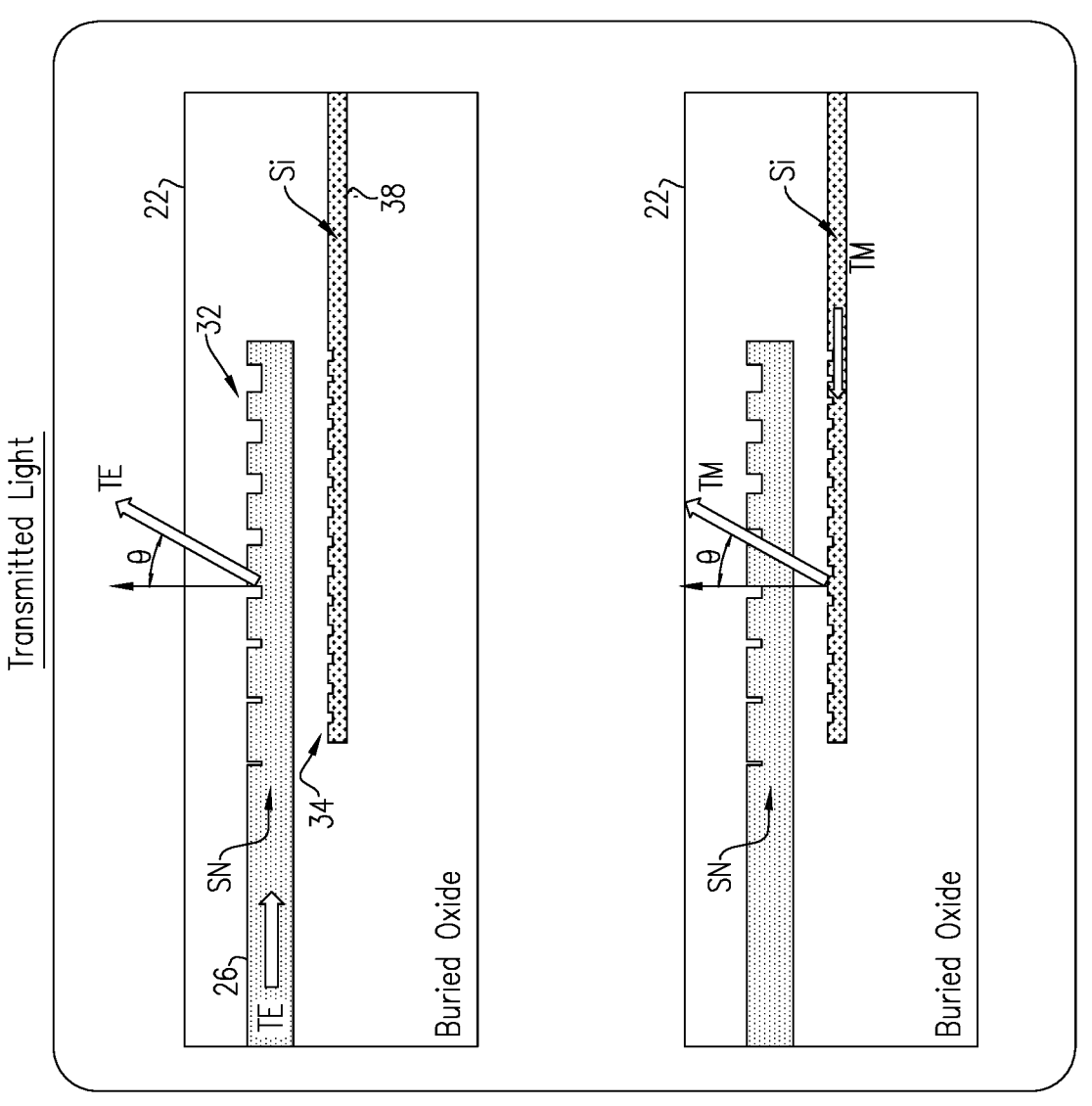
FIGS. 3A and 3B are schematic detail views of the paths of transmitted and received beams in a coupling device, in accordance with an embodiment of the invention.
Figure 3B:
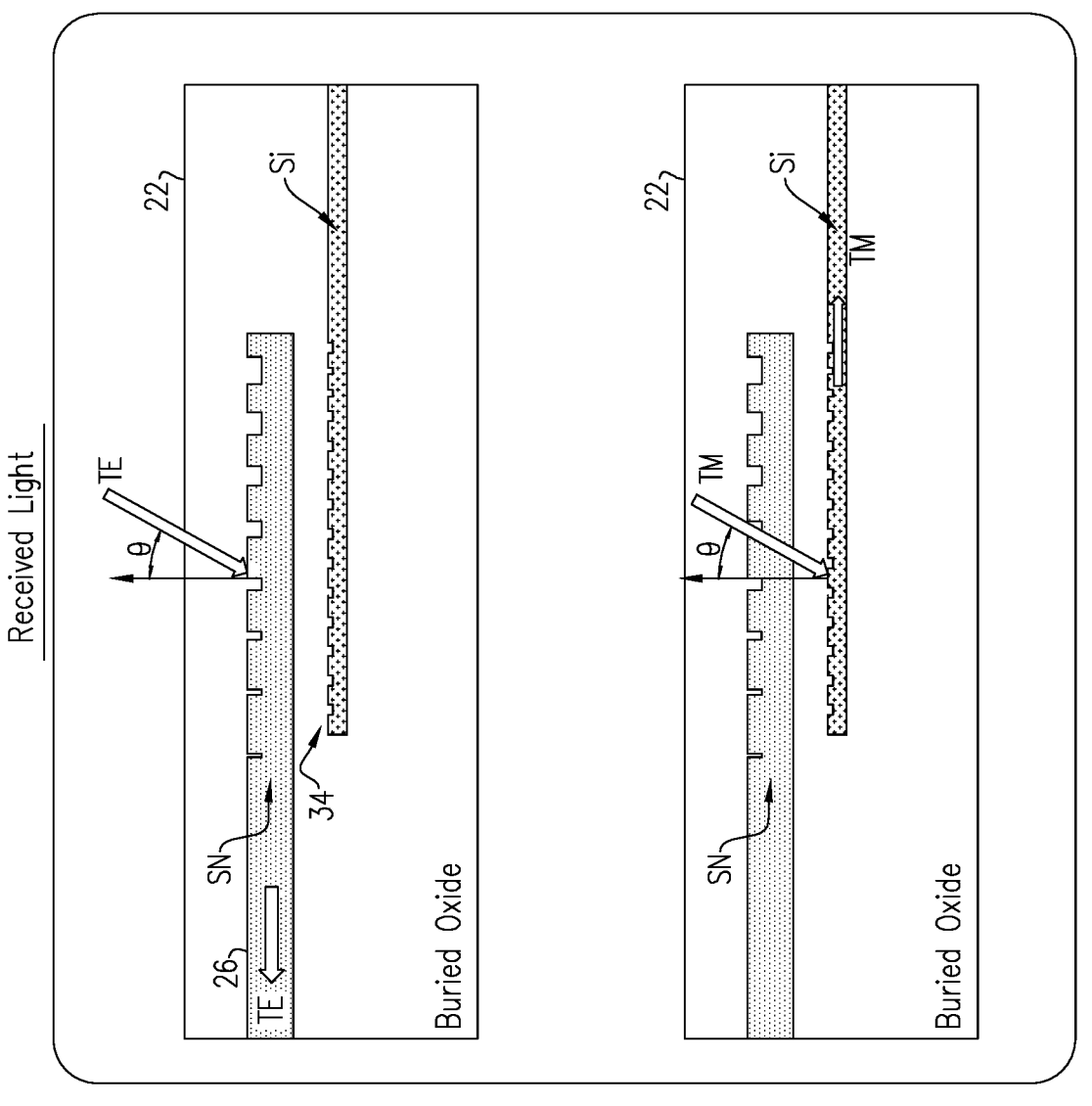

Reference is now made to FIGS. 2, 3A and 3B, which are schematic sectional views of coupling device 22, showing the paths of transmitted and received beams, in accordance with an embodiment of the invention. FIG. 2 shows an overview of device 22, including the paths of a transmitted TE beam 50 via waveguide 26 and a received TM beam 52 coupled into waveguide 38. FIGS. 3A and 3B are schematic detail views of the possible paths of transmitted and received beams in device 22.

Device 22 comprises a dielectric substrate layer, for example a buried $SiO_2$ layer 54 on the SOT wafer. A silicon waveguide layer 56 is deposited over $SiO_2$ layer and is patterned and etched to define receive waveguide 38 and grating 34. A dielectric intermediate layer 58, also comprising $SiO_2$, is deposited over silicon waveguide layer 56. A SiN waveguide layer 60 is deposited over intermediate layer 58 and is patterned and etched to define transmit waveguide 26 and grating 32. An additional $SiO_2$ cladding layer 62 is deposited over waveguide layer 60.

Gratings 32 and 34 comprise alternating peaks 64 and troughs 66, which are etched into the corresponding waveguide layers 56, 60. The spacings of the peaks and troughs are generally not uniform, but rather are computed in a process of optimization. The objective of the optimization is to maximize the fraction of the optical power in TE beam 50 in waveguide 26 that is output from coupling device 22 at a selected coupling angle θ with a desired (typically Gaussian) beam profile and simultaneously to maximize the fraction of incident light 68 at this same angle θ with TM polarization that is coupled into TM beam 52 in waveguide 38, while minimizing back-reflection of TE beam 50 into waveguide 26. Any suitable numerical optimization technique may be used for this purpose, such as genetic algorithms, particle swarm optimization, or gradient-based approaches, together with suitable micro-optical simulation software to estimate the beam coupling efficiencies at each stage of the optimization.

As explained earlier, grating 32 diffracts a fraction of TE beam 50 outward into a diffraction order 70, at angle θ, but also diffracts another fraction into a conjugate diffraction order 72 at angle −θ. Grating 34 diffracts this latter fraction of TE beam 50 back out of device 22 into a diffracted beam 74, at the same angle θ as diffraction order 70. Because of the reversibility of the beams, incoming TE light at angle θ will also be coupled into waveguide 26 (as shown at the upper side of FIG. 3B), and outgoing TM light may also be coupled out of waveguide 38 at angle θ (as shown at the lower side of FIG. 3A).

The angle θ is a design parameter that can be set by the grating designer depending on application requirements. Thus, for example, in an array of optical transceivers 20, each with its own coupling device 22, the coupling devices may have different coupling angles, which vary across the array. For example, in an array in which all the optical transceivers share the same collimation optics, the coupling angle of each transceiver may be directed toward the center of the pupil of the optics in order to optimize optical quality and uniformity. An array of this sort is shown, for example, in FIGS. 5A/B.

The optimal configuration of gratings 32 and 34 in each coupling device will depend on the desired coupling angle, as well as on the wavelength of beam 50 and the parameters of the waveguide and dielectric layers. Table I below presents an example design of the gratings assuming a coupling angle θ=10 degrees in oxide and a wavelength of 1310 nm. In this design, silicon waveguide layer 56 is taken to have a thickness of 220 nm, while SiN waveguide layer 60 has a thickness of 400 nm, and intermediate layer 58 has a thickness of 250 nm, i.e., there is a separation of 250 nm between the SiN and silicon waveguide layers. Troughs 66 in grating 34 have a depth of 130 nm (reducing the silicon thickness in the troughs to 90 nm), while troughs in grating 32 extend through the entire 400 nm thickness of waveguide layer 60. The numbers in the table below represent the widths, in μm, of successive troughs and peaks, in alternation, in the two gratings. A leading edge 80 of the first (leftmost) trough 66 in grating 34 is located at X=−2.457 μm relative to an arbitrary origin (X=0), while a leading edge 82 of the first (leftmost) trough in grating 32 is located at X=0.357 μm. The gratings illustrated in FIG. 2 do not match the locations and widths of the troughs and peaks listed in Table I.

TABLE I

EXAMPLE GRATING DESIGN (TROUGH AND PEAK WIDTHS)

| Edge no. | Grating 32 (SiN) | Grating 34 (Si) |
|---|---|---|
| 1 | 0.357 | −2.457 |
| 2 | 0.475 | 0.180 |
| 3 | 0.436 | 0.569 |
| 4 | 0.445 | 0.140 |
| 5 | 0.539 | 0.341 |
| 6 | 0.491 | 0.140 |
| 7 | 0.300 | 0.495 |
| 8 | 0.300 | 0.140 |
| 9 | 0.558 | 0.354 |
| 10 | 0.346 | 0.154 |
| 11 | 0.587 | 0.459 |
| 12 | 0.583 | 0.220 |
| 13 | 0.654 | 0.355 |
| 14 | 0.664 | 0.330 |
| 15 | 0.603 | 0.310 |
| 16 | 0.552 | 0.202 |
| 17 | 0.439 | 0.370 |
| 18 | 0.495 | 0.227 |
| 19 | 0.741 | 0.351 |
| 20 | 0.517 | 0.224 |
| 21 | 0.651 | 0.348 |
| 22 | 0.546 | 0.174 |
| 23 | 0.510 | 0.285 |
| 24 | 0.442 | 0.364 |
| 25 | 0.483 | 0.244 |
| 26 | 0.326 | 0.140 |
| 27 | | 0.358 |
| 28 | | 0.146 |

Figure 4:
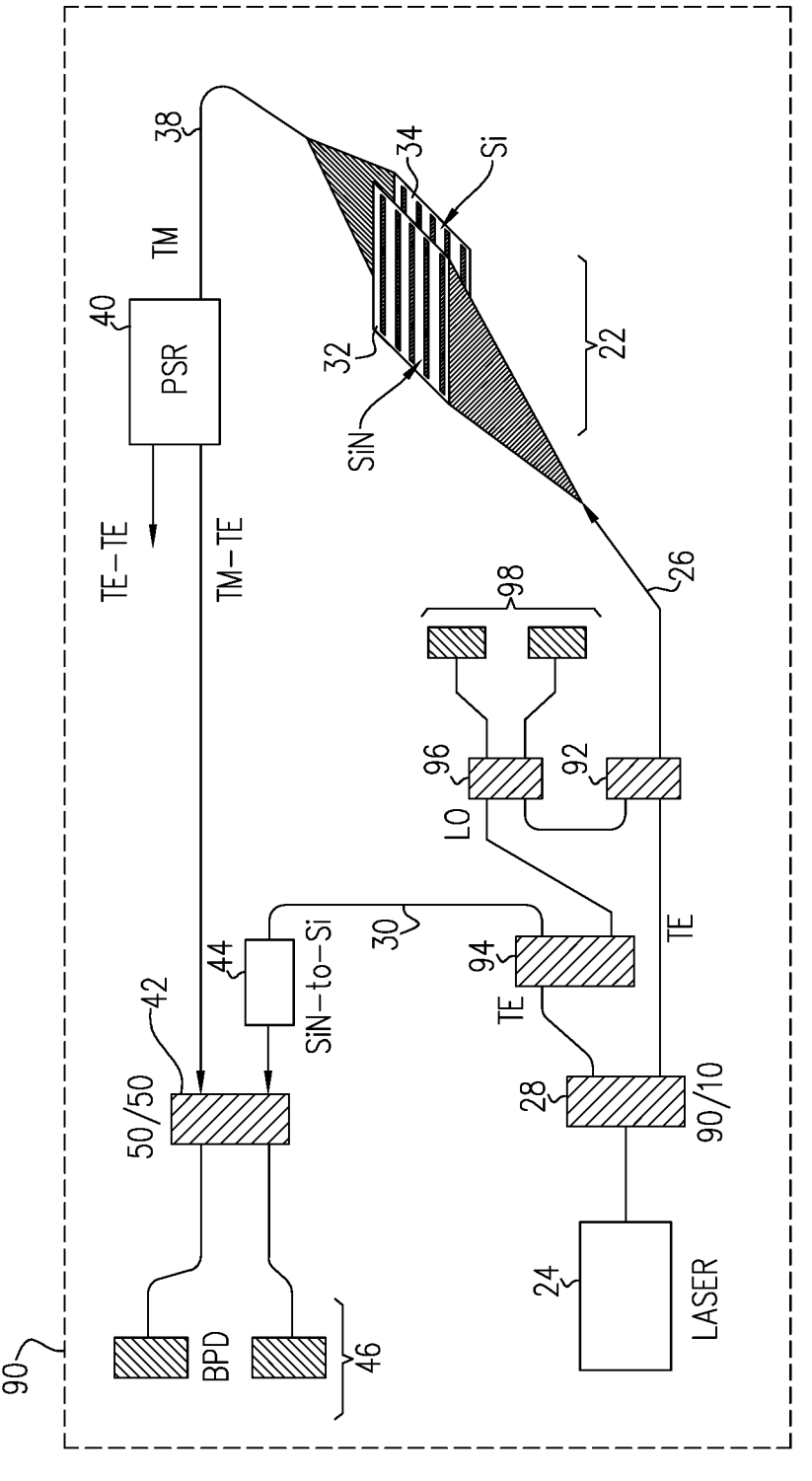
FIG. 4 is a schematic pictorial view of a monostatic optical transceiver with a bidirectional coupling device, in accordance with another embodiment of the invention.

FIG. 4 is a schematic pictorial view of a monostatic optical transceiver 90 with bidirectional coupling device 22, in accordance with another embodiment of the invention. Transceiver 90 is similar in design to transceiver 20 (FIG. 1); and most of the elements of transceiver 90 are identical to the corresponding elements in transceiver 20 and are marked with the same indicator numbers. Unlike transceiver 20, however, in which TE light that is incident on coupler 22 is discarded, in transceiver 90 the incident light in both the TM and TE polarizations is received and processed.

Specifically, TE light that is incident on coupling device 22 at the appropriate coupling angle is coupled by grating 32 into transmit waveguide 26. A directional coupler 92 splits off the received TE light into a mixer 96, where the received TE light is mixed with a part of the LO beam that is split off from the transmitted beam by splitters 28 and 94. An additional optical receiver 98, comprising a suitable detector such as a BPD pair, receives the mixed light from mixer 96 and generates an additional electrical output signal, which is processed along with the signal from receiver 46. This ability to receive and process diverse polarizations may enhance the signal/noise ratio of transceiver 90 relative to transceiver 20.

Figure 5A:
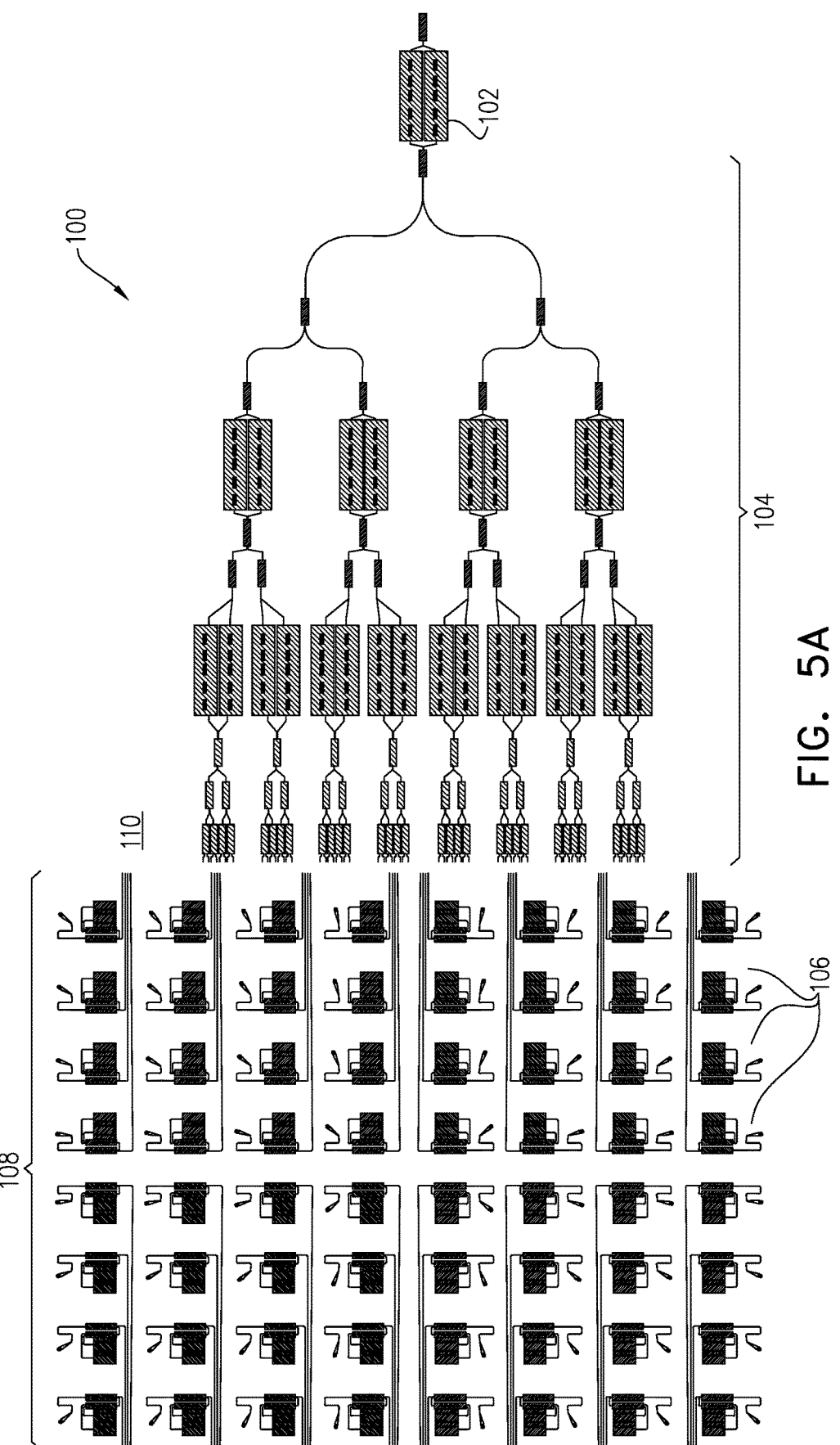
FIG. 5A is a schematic top view of optical sensing apparatus including an array of optical transceivers with respective coupling devices, in accordance with an embodiment of the invention.
Figure 5B:
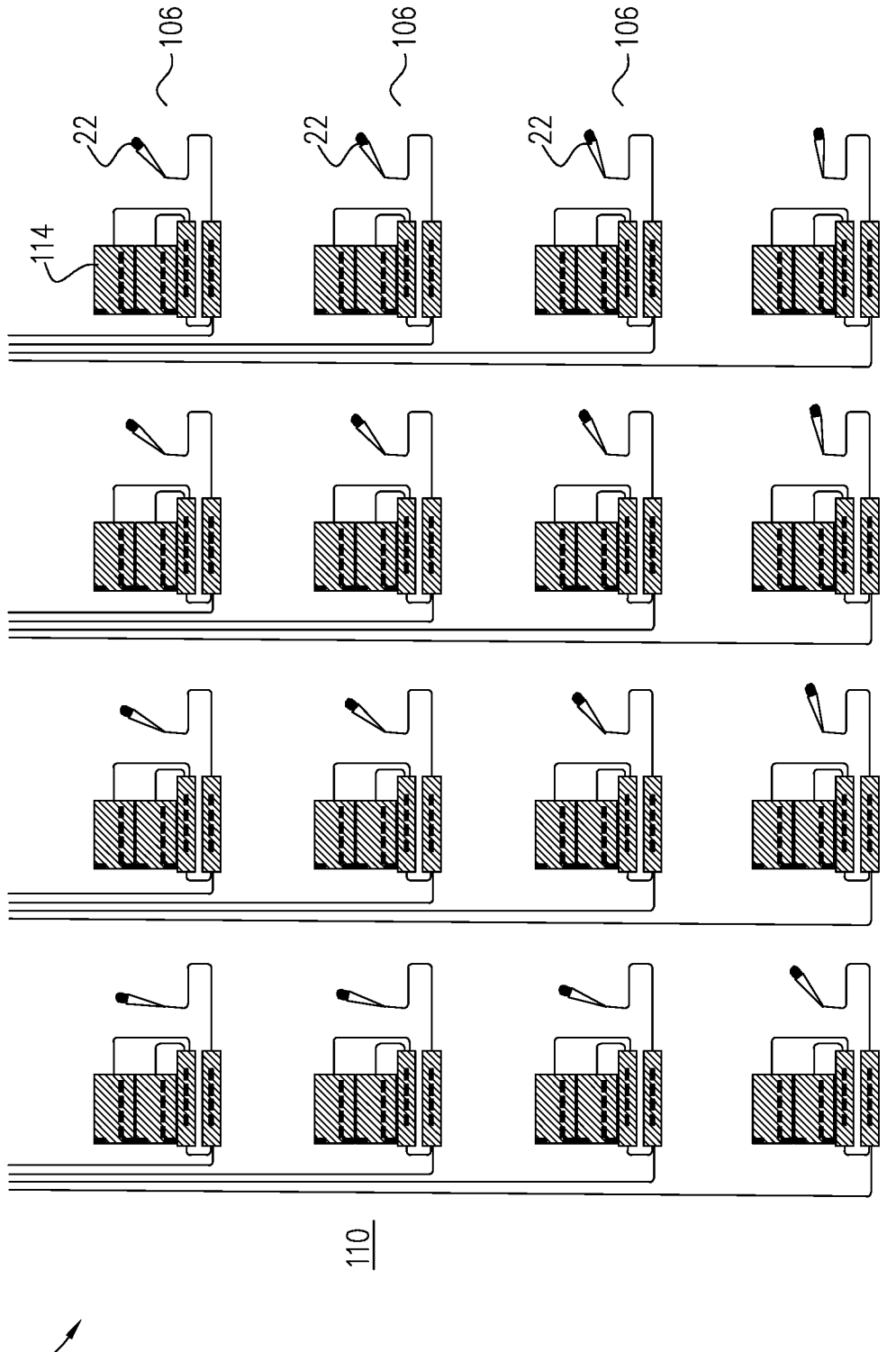
FIG. 5B is a schematic detail view of one quadrant of the array of FIG. 5A.

Reference is now made to FIGS. 5A and 5B, which schematically illustrate optical sensing apparatus 100, including an array 108 of optical transceivers 106 with respective coupling devices 22, in accordance with an embodiment of the invention. FIG. 5A is a top view of apparatus 100, while FIG. 5B is a detail view of an upper-right quadrant 112 of array 108.

Apparatus 100 comprises a substrate 110, such as an SOI substrate, on which transceivers 106 are formed along with an input switch 102 and an optical network 104, which divides and routes the beam from a laser source (not shown in these figures) to transceivers 106. In the pictured embodiment, array 108 comprises sixty-four transceivers 106 in a square matrix layout; but alternatively, other arrangements may be used, including smaller or larger numbers of optical transceivers, as well as other array geometries.

As shown in FIG. 5B, each transceiver 106 comprises optical circuitry 114, typically comprising waveguides and other optical components, for example as shown in FIG. 1 or FIG. 4. Coupling device 22 in each transceiver 106 is oriented and designed so that the axis of the TE beam emitted from the coupling device is directed toward the center of the pupil of the collimating optics serving array 108, such as optics 36 in FIG. 1, and the reflected TM beam is received along this same axis. For this purpose, gratings 32 and 34 are rotated to the appropriate azimuth in the plane of substrate 110; and the grating spacings are adjusted to give the appropriate elevation angle θ, which increases (relative to an axis normal to the substrate) with distance from the center of array 108. The structures of the other quadrants are identical to quadrant 112, with appropriate rotation of the azimuths of coupling devices 22.

The embodiment of FIGS. 5A/B can advantageously use the sorts of bi-layer coupling devices 22 that are shown and described above, as such coupling devices can be designed for efficient transmission and reception at the optimal coupling angle for each transceiver 106. Alternatively, the principles of this embodiment may be applied using grating couplers of other types, including single-layer couplers, as long as the gratings can be designed and oriented to operate at the desired coupling angles. Although it can be advantageous in the present embodiment, as well as these alternative embodiments, that the coupling angles be directed toward the center of the pupil of the optics that are used with the array, other variable-angle schemes may alternatively be implemented in similar fashion. Furthermore, although the cells of array 108 in apparatus 100 comprise transceivers, the principles of angular coupling that are embodied in apparatus 100 may alternatively be applied in arrays of optical cells of other sorts, such as transmitter cells or receiver cells. All such alternative embodiments and implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical coupling device, comprising:
a dielectric substrate layer;
a first waveguide layer, comprising a first semiconductor material, which is disposed over the dielectric substrate layer;
a dielectric intermediate layer overlying the first waveguide layer;
a second waveguide layer, which comprises a second semiconductor material, different from the first semiconductor material, which is disposed over the dielectric intermediate layer and is patterned to define a waveguide;
a first grating, which is formed in the second waveguide layer and is configured to diffract input light of a given wavelength from the waveguide into a specified diffraction order at a given coupling angle, whereby a first fraction of the input light propagates out of the optical coupling device into a transmitted beam at the given coupling angle while a second fraction of the input light is diffracted by the first grating into the dielectric intermediate layer in a conjugate diffraction order; and
a second grating, which is formed in the first waveguide layer and is configured to diffract the second fraction of the input light into a second diffraction order, propagating out of the device at the given coupling angle, whereby the second grating acts as a reflector for the conjugate diffraction order to enhance coupling efficiency of the input light into the transmitted beam.

2. The optical coupling device according to claim 1, wherein the first grating is configured to diffract the input light of a first polarization into the specified diffraction order, and wherein the second grating is further configured to diffract incoming light of the given wavelength that is incident on the device at the given coupling angle with a second polarization, orthogonal to the first polarization, into the first waveguide layer.

3. The optical coupling device according to claim 2, wherein the first polarization is a TE polarization propagating in the waveguide in the second waveguide layer, and wherein the first waveguide layer comprises a further waveguide, and the second polarization is a TM polarization, which propagates in the further waveguide.

4. An optical transceiver, comprising:
the optical coupling device according to claim 2;
an optical transmitter, which is coupled to transmit the input light of the first polarization into the waveguide in the second waveguide layer; and
an optical receiver, which is coupled to receive the incoming light of the second polarization from a further waveguide in first waveguide layer.

5. The optical transceiver according to claim 4, wherein the input light comprises coherent radiation, and wherein the transceiver comprises a mixer, which is coupled to mix a part of the transmitted light with the incoming light that is received through the further waveguide and to output the mixed light to the optical receiver.

6. The optical transceiver according to claim 5, wherein the first grating is further configured to diffract the incoming light of the first polarization that is incident on the device at the given angle into the waveguide in the second waveguide layer, and wherein the transceiver comprises a further mixer, which is coupled to mix a further part of the transmitted light with the incident light of the first polarization that is received through the waveguide in the second waveguide layer for output to a detector.

7. An apparatus for optical sensing, comprising: an optical sensing substrate; and an array of optical transceivers according to claim 4, disposed on the optical sensing substrate and configured to transmit the input light and receive the incoming light via respective optical coupling devices.

8. The apparatus according to claim 7, wherein the optical coupling devices have respective coupling angles that vary across the array.

9. The optical coupling device according to claim 1, wherein the first waveguide layer comprises silicon, and the second waveguide layer comprises silicon nitride.

10. A method for optical coupling, comprising:
depositing a first waveguide layer, comprising a first semiconductor material, over a dielectric substrate layer;
depositing a dielectric intermediate layer over the first waveguide layer;
depositing a second waveguide layer, which comprises a second semiconductor material, different from the first semiconductor material, over the dielectric intermediate layer;
patterning the second waveguide layer to define a waveguide;
forming in the second waveguide layer a first grating configured to diffract input light of a given wavelength from the waveguide into a specified diffraction order at a given coupling angle, whereby a first fraction of the input light propagates into a transmitted beam at the given coupling angle while a second fraction of the input light is diffracted by the first grating into the intermediate dielectric layer in a conjugate diffraction order; and
forming in the first waveguide layer a second grating, which is configured to diffract the second fraction of the input light into a second diffraction order, propagating at the given coupling angle, whereby the second grating acts as a reflector for the conjugate diffraction order to enhance coupling efficiency of the input light into the transmitted beam.

11. The method according to claim 10, wherein the first grating is configured to diffract the input light of a first polarization into the specified diffraction order, and wherein the second grating is further configured to diffract incoming light of the given wavelength that is incident on the second grating at the given coupling angle with a second polarization, orthogonal to the first polarization, into the first waveguide layer.

12. The method according to claim 11, wherein the first polarization is a TE polarization propagating in the waveguide in the second waveguide layer, and wherein the method comprises patterning the first waveguide layer to define a further waveguide, wherein the second polarization is a TM polarization, which propagates in the further waveguide.

13. The method according to claim 11, and comprising:
coupling an optical transmitter to transmit the input light of the first polarization into the waveguide in the second waveguide layer; and coupling an optical receiver to receive the incoming light of the second polarization from a further waveguide in first waveguide layer.

14. The method according to claim 13, wherein the input light comprises coherent radiation, and the method comprises mixing a part of the transmitted light with the incoming light that is received through the further waveguide and outputting the mixed light to the optical receiver.

15. The method according to claim 14, wherein the first grating is further configured to diffract the incoming light of the first polarization that is incident at the given angle into the waveguide in the second waveguide layer, and wherein the method comprises mixing a further part of the transmitted light with the incident light of the first polarization that is received through the waveguide in the second waveguide layer for output to a detector.

16. The method according to claim 10, wherein the first waveguide layer comprises silicon, and the second waveguide layer comprises silicon nitride.

\* \* \* \* \*